US007009939B2

(12) United States Patent
Baker et al.

(10) Patent No.: US 7,009,939 B2
(45) Date of Patent: Mar. 7, 2006

(54) ADAPTIVE RESOURCE MANAGEMENT IN A COMMUNICATION SYSTEM

(75) Inventors: Albert D. Baker, Lincroft, NJ (US); John Donald Unruh, Mendham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 853 days.

(21) Appl. No.: 09/861,947

(22) Filed: May 21, 2001

(65) Prior Publication Data

US 2002/0172273 A1 Nov. 21, 2002

(51) Int. Cl.
*H04L 12/50* (2006.01)
*H04M 3/00* (2006.01)

(52) U.S. Cl. .................. 370/252; 370/468; 370/477; 370/535; 379/93.01; 379/221.07

(58) Field of Classification Search ............... 370/235, 370/236.1, 354, 386, 468, 463, 232, 352, 370/394, 477, 252, 535; 710/110, 305; 707/100; 709/225; 379/93.01, 221.07
See application file for complete search history.

(56) References Cited

U.S. PATENT DOCUMENTS

| | | | | |
|---|---|---|---|---|
| 5,315,586 | A * | 5/1994 | Charvillat | 370/232 |
| 6,310,857 | B1 * | 10/2001 | Duffield et al. | 370/232 |
| 6,359,881 | B1 * | 3/2002 | Gerszberg et al. | 370/354 |
| 6,389,493 | B1 * | 5/2002 | Barkley et al. | 710/110 |
| 6,438,141 | B1 * | 8/2002 | Hanko et al. | 370/477 |
| 6,452,942 | B1 * | 9/2002 | Lemieux | 370/468 |
| 6,459,702 | B1 * | 10/2002 | Saaverda et al. | 370/422 |
| 6,529,479 | B1 * | 3/2003 | Suzuki | 370/236.1 |
| 6,580,727 | B1 * | 6/2003 | Yim et al. | 370/463 |
| 6,597,689 | B1 * | 7/2003 | Chiu et al. | 370/354 |
| 6,636,894 | B1 * | 10/2003 | Short et al. | 709/225 |
| 6,714,516 | B1 * | 3/2004 | Todd | 370/235 |
| 6,721,750 | B1 * | 4/2004 | Jones et al. | 707/100 |
| 6,725,311 | B1 * | 4/2004 | Joy et al. | 710/305 |
| 6,765,910 | B1 * | 7/2004 | Johnson | 370/394 |
| 6,775,271 | B1 * | 8/2004 | Johnson et al. | 370/352 |
| 6,876,668 | B1 * | 4/2005 | Chawla et al. | 370/468 |
| 2002/0154629 | A1 * | 10/2002 | Lohman et al. | 370/386 |

\* cited by examiner

*Primary Examiner*—Alpus H. Hsu

(57) ABSTRACT

Methods and apparatus for allocating a system resource in a communication system having an interconnected set of modules and for which the system resource is allocated among the modules are disclosed. The interconnected set of modules may be a multi-shelf daisy-chained DSL access multiplexer (DSLAM), with each of the modules corresponding to a particular shelf of the DSLAM. The system resource is initially allocated among the modules in accordance with a predetermined allocation, e.g., a reserve pool is established with a first portion of the system resource and the remaining portion of the system resource is equally divided among the interconnected modules. The allocation of the system resource is then periodically updated based at least in part on measured characteristics of at least a subset of the modules, the measured characteristics being indicative of utilization of the initial allocation. For example, utilization history data or requests for additional resource allocation may be measured and used in the periodic updating. In the daisy-chained DSLAM implementation, each of the shelves of the DSLAM may have associated therewith a resource measurement and management system (RMMS) element that processes information relating to the initial allocation and the periodic updates.

15 Claims, 7 Drawing Sheets

FIG. 4A

| SHELF ID | CIRCUIT PACK TYPE | T=0 | T=1 | T=2 | T=3 | T=4 |
|---|---|---|---|---|---|---|
| 1 | OC-3 FEEDER | CBR=10.33 rtVBR=10.33 nrtVBR=10.33 UBR=10.33 | CBR= rtVBR= nrtVBR= UBR= | CBR= rtVBR= nrtVBR= UBR= | CBR= rtVBR= nrtVBR= UBR= | CBR= rtVBR= nrtVBR= UBR= |
| 2 | OC-3 FEEDER | CBR=10.33 rtVBR=10.33 nrtVBR=10.33 UBR=10.33 | CBR= rtVBR= nrtVBR= UBR= | CBR= rtVBR= nrtVBR= UBR= | CBR= rtVBR= nrtVBR= UBR= | CBR= rtVBR= nrtVBR= UBR= |
| 3 | OC-3 FEEDER | CBR=10.33 rtVBR=10.33 nrtVBR=10.33 UBR=10.33 | CBR= rtVBR= nrtVBR= UBR= | CBR= rtVBR= nrtVBR= UBR= | CBR= rtVBR= nrtVBR= UBR= | CBR= rtVBR= nrtVBR= UBR= |

FIG. 4B

| SHELF ID | CIRCUIT PACK TYPE | END OF T=0 | END OF T=1 | END OF T=2 | END OF T=3 | END OF T=4 |
|---|---|---|---|---|---|---|
| 1 | OC-3 FEEDER | CBR=15.33<br>rtVBR=12.33<br>nrtVBR=6.33<br>UBR=10.33 | CBR=<br>rtVBR=<br>nrtVBR=<br>UBR= | CBR=<br>rtVBR=<br>nrtVBR=<br>UBR= | CBR=<br>rtVBR=<br>nrtVBR=<br>UBR= | CBR=<br>rtVBR=<br>nrtVBR=<br>UBR= |
| 2 | OC-3 FEEDER | CBR=7.83<br>rtVBR=8.55<br>nrtVBR=6.44<br>UBR=15.22 | CBR=<br>rtVBR=<br>nrtVBR=<br>UBR= | CBR=<br>rtVBR=<br>nrtVBR=<br>UBR= | CBR=<br>rtVBR=<br>nrtVBR=<br>UBR= | CBR=<br>rtVBR=<br>nrtVBR=<br>UBR= |
| 3 | OC-3 FEEDER | CBR=5.53<br>rtVBR=11.33<br>nrtVBR=4.33<br>UBR=9.30 | CBR=<br>rtVBR=<br>nrtVBR=<br>UBR= | CBR=<br>rtVBR=<br>nrtVBR=<br>UBR= | CBR=<br>rtVBR=<br>nrtVBR=<br>UBR= | CBR=<br>rtVBR=<br>nrtVBR=<br>UBR= |

FIG. 4C

| SHELF ID | CIRCUIT PACK TYPE | T=0 | T=1 | T=2 | T=3 | T=4 |
|---|---|---|---|---|---|---|
| 1 | OC-3 FEEDER | CBR=10.33<br>rtVBR=10.33<br>nrtVBR=10.33<br>UBR=10.33 | CBR=12.83<br>rtVBR=11.33<br>nrtVBR=8.33<br>UBR=10.33 | CBR=<br>rtVBR=<br>nrtVBR=<br>UBR= | CBR=<br>rtVBR=<br>nrtVBR=<br>UBR= | CBR=<br>rtVBR=<br>nrtVBR=<br>UBR= |
| 2 | OC-3 FEEDER | CBR=10.33<br>rtVBR=10.33<br>nrtVBR=10.33<br>UBR=10.33 | CBR=9.08<br>rtVBR=9.44<br>nrtVBR=8.39<br>UBR=12.77 | CBR=<br>rtVBR=<br>nrtVBR=<br>UBR= | CBR=<br>rtVBR=<br>nrtVBR=<br>UBR= | CBR=<br>rtVBR=<br>nrtVBR=<br>UBR= |
| 3 | OC-3 FEEDER | CBR=10.33<br>rtVBR=10.33<br>nrtVBR=10.33<br>UBR=10.33 | CBR=7.93<br>rtVBR=10.83<br>nrtVBR=7.33<br>UBR=9.82 | CBR=<br>rtVBR=<br>nrtVBR=<br>UBR= | CBR=<br>rtVBR=<br>nrtVBR=<br>UBR= | CBR=<br>rtVBR=<br>nrtVBR=<br>UBR= |

ADAPTIVE RESOURCE MANAGEMENT IN A COMMUNICATION SYSTEM

FIELD OF THE INVENTION

The present invention relates generally to communication systems, such as systems including asynchronous transfer mode (ATM) connections or digital subscriber line (DSL) connections, and more particularly to techniques for managing allocation of bandwidth or other communication resources in such systems.

BACKGROUND OF THE INVENTION

Resource management issues can be particularly problematic in communication systems which configure switching or access modules in a "daisy chain" fashion and then allocate bandwidth between the chained modules. For example, a system which includes a daisy-chained digital subscriber line (DSL) access multiplexer (DSLAM) having multiple shelves generally requires an installation-time shelf-by-shelf administration of particular bandwidth allocations based on estimates of the amount of bandwidth that each shelf will be permitted to consume on an associated network feeder. Such an arrangement thus requires that an estimate of bandwidth usage be generated for each member of the daisy-chained DSLAM. Unfortunately, the above-described type of installation-time administration can require an excessive amount of skilled technician time to implement, and is therefore often unduly expensive for the system operator.

Another problem is that the initial estimates often turn out to be insufficiently accurate over time due to variations in factors such as user calling patterns, user mix, and distribution network topology, thereby allowing some allocated bandwidth to be unused by certain shelves, while simultaneously "starving" busy shelves. These and other types of time-based variations need to be reflected in the system bandwidth allocations in order to prevent denial of a given call at a particular shelf when in fact the daisy-chained DSLAM has sufficient total capacity to service that call. Moreover, updates to bandwidth allocations in conventional daisy-chained DSLAM systems, like the previously-described initial allocations, are typically implemented manually by a system administrator or other skilled technician.

A need therefore exists in the art for resource management techniques that can eliminate the above-noted problems associated with installation-time administration, and can automatically adjust allocations during operation to optimize utilization of the bandwidth resource.

SUMMARY OF THE INVENTION

The present invention overcomes one or more of the above-noted problems of the prior art by providing techniques for adaptive resource management in a communication system.

In accordance with one aspect of the invention, a system resource is allocated among interconnected modules of a communication system. The interconnected set of modules may be a multi-shelf daisy-chained DSL access multiplexer (DSLAM), with each of the modules corresponding to a particular shelf of the DSLAM. The system resource is initially allocated among the modules in accordance with a predetermined allocation, e.g., a reserve pool is established with a first portion of the system resource and the remaining portion of the system resource is equally divided among the interconnected modules. The allocation of the system resource is then periodically updated based at least in part on measured characteristics of at least a subset of the modules, the measured characteristics being indicative of utilization of the initial allocation. For example, utilization history data or requests for additional resource allocation may be measured and used in the periodic updating.

In the daisy-chained DSLAM implementation, each of the shelves of the DSLAM may have associated therewith a resource measurement and management system (RMMS) element that processes information relating to the initial allocation and the periodic updates. In addition, allocating bandwidth or other system resources in accordance with the invention allows each shelf of a daisy-chained DSLAM to independently execute connection admission control (CAC) procedures.

An illustrative embodiment of a daisy-chained DSLAM system in accordance with the invention fully automates both the initial allocation and the periodic update processes, such that these processes are implemented automatically by the system without the need for manual intervention.

Advantageously, the invention provides a system that can self-initialize its resource allocations and subsequently self-optimize the allocations over time, thereby providing significant installation and run-time cost savings.

These and other features and advantages of the present invention will become more apparent from the accompanying drawings and the following detailed description.

BRIEF DESCRIPTION OF THE DRAWINGS

FIGS. 4A, 4B and 4C are tabular listings of resource management information utilized in an example utilization-based resource management process of the present invention.

DETAILED DESCRIPTION OF THE INVENTION

The present invention will be illustrated below in conjunction with exemplary communication systems utilizing asynchronous transfer mode (ATM) signaling protocols. It should be understood, however, that the disclosed techniques are suitable for use with a wide variety of other types of communication systems including, e.g., Frame Relay systems, IP systems, asymmetric digital subscriber line (ADSL), synchronous optical network (Sonet)/synchronous digital hierarchy (SDH), wireless networks, etc.

The term "call" as used herein should be understood to include any type of communication path that may be established in a communication system having a resource management function of the type described herein.

The present invention in accordance with one aspect thereof automates the management of a system resource such as bandwidth in a communication system having a group of switching or access modules arranged in a daisy chain or other similar interconnected arrangement.

Figure 1:
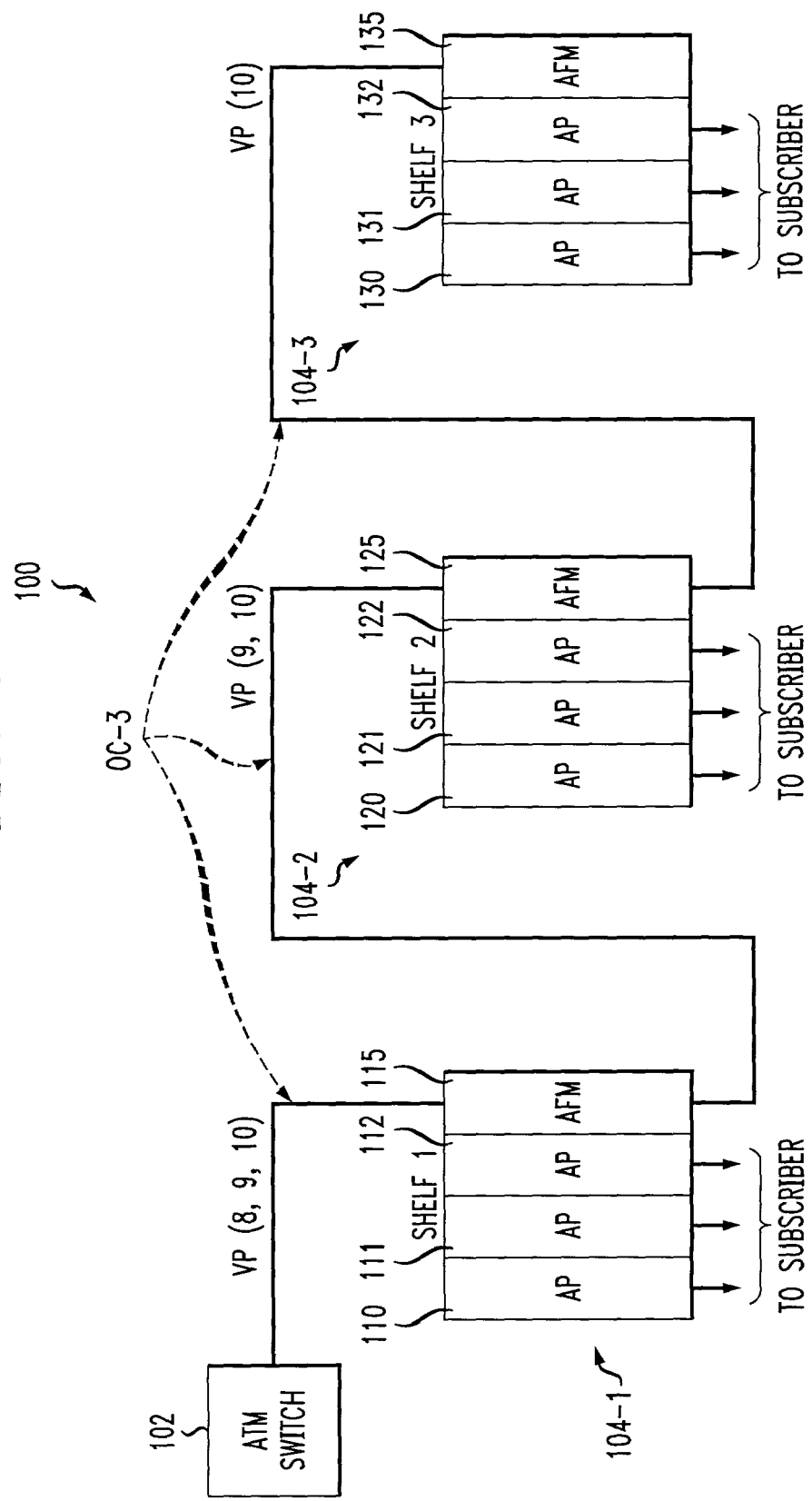
FIG. 1 is a block diagram of a portion of an exemplary communication system in which the invention is implemented.

FIG. 1 shows a portion of a communication system 100 in accordance with the illustrative embodiment of the invention. The system 100 includes an asynchronous transfer mode (ATM) switch 102 having coupled thereto a set of three DSL access multiplexers (DSLAMS) 104-1, 104-2 and 104-3. The DSLAMs 104-1, 104-2 and 104-3 are arranged in a daisy chain as shown and are collectively referred to herein as a multi-shelf daisy-chained DSLAM. The DSLAMs 104-1, 104-2 and 104-3 each correspond to a particular shelf of the multi-shelf daisy-chained DSLAM, i.e., the DSLAMs 104-1, 104-2 and 104-3 correspond to Shelf 1, Shelf 2 and Shelf 3, respectively, of the multi-shelf daisy-chained DSLAM.

The switch 102 may be configured to include known communication processing functions. For example, the switch 102 in the illustrative embodiment is configured to provide processing operations associated with communication over an ATM network. In other embodiments, the daisy-chained DSLAM or other system processing elements may be considered part of the communication system switch. The term "switch" as used herein is thus intended to be construed generally so as to permit inclusion of devices such as ATM switch 102 as well as devices which combine such an element with one or more multiplexing devices such as a DSLAM or other type of network processing element.

The DSLAMs 104-1, 104-2 and 104-3 are coupled to the switch 102 in this example via ATM virtual path (VP) connections identified as VP(8, 9, 10), VP(9, 10) and VP(10). More particularly, the ATM switch 102 is coupled to the Shelf 1 DSLAM 104-1 via ATM VP connection VP(8, 9, 10), the Shelf 1 DSLAM 104-1 is coupled to the Shelf 2 DSLAM 104-2 via ATM VP connection VP(9, 10), and the Shelf 2 DSLAM 104-2 is coupled to the Shelf 3 DSLAM 104-3 via ATM VP connection VP(10). Each of the VP connections in this embodiment is indicated in the figure as being an OC-3 connection, but other types of connections could be used in other embodiments. For example, the connections could more generally be OC-x connections, DS-x connections or other types of well-known conventional connections, as will be appreciated by those skilled in the art. The OC-3 connections shown in FIG. 1 are examples of connections more generally referred to herein as "feeders."

Each of the DSLAMS 104-1, 104-2 and 104-3 in this embodiment includes a group of three application packs (APs) and an ATM feeder multiplexer (AFM). More particularly, DSLAM 104-1 includes APs 110, 111 and 112 and AFM 115, DSLAM 104-2 includes APs 120, 121 and 122 and AFM 125, and DSLAM 104-3 includes APs 130, 131 and 132 and AFM 135. Each of the APs supports a set of distribution loops, in this case asymmetric digital subscriber line (ADSL) connections, and is configured in a conventional manner.

Figure 2A:
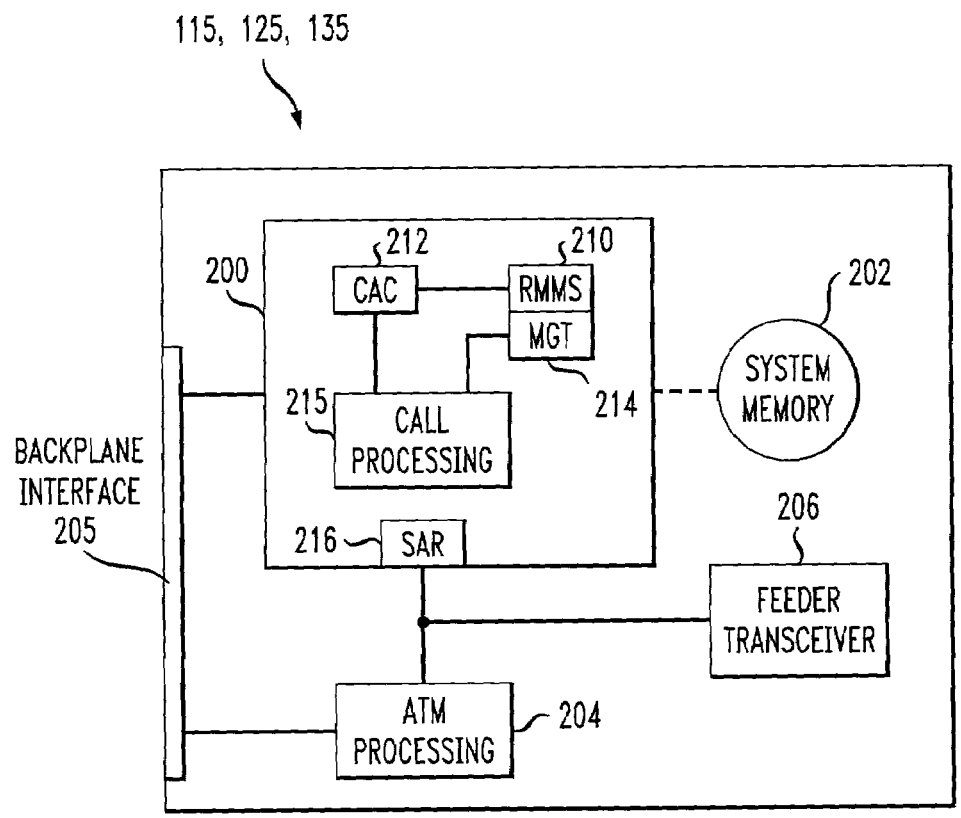
FIG. 2A is a block diagram of an illustrative embodiment of an ATM feeder multiplexer (AFM) element of the FIG. 1 system.

FIG. 2A shows a more detailed view of a given one of the AFMs 115, 125 or 135 of the FIG. 1 system. Each of the AFMs 115, 125 and 135 are assumed for purposes of the illustrative embodiment to be configured in substantially the same manner, but it should be understood that this is not a requirement of the invention. The example AFM as shown in FIG. 2A includes a processor 200 having a system memory element 202 accessible thereto, an ATM processing element 204, a backplane interface 205, and a feeder transceiver 206.

The term "processor" as used herein is intended to include any arrangement of one or more processing devices configured to provide adaptive resource management in the manner described herein. The processor 200 of FIG. 2A may therefore be implemented in the form of multiple processing devices each providing a designated processing element, as a single processing device providing multiple processing elements, or in other suitable configurations.

The processor 200 comprises a number of processing elements in this embodiment, including a resource measurement and management system (RMMS) 210, a connection admission control (CAC) element 212, a management (MGT) element 214, a call processing element 215, and an ATM segmentation and reassembly (SAR) element 216. The processor 200 is coupled to the ATM processing element 204 and the feeder transceiver 206 via the SAR element 216 and to the backplane interface 205.

The present invention in the illustrative embodiment is implemented at least in part in the RMMS 210 of the AFMs 115, 125 and 135.

Figure 2B:
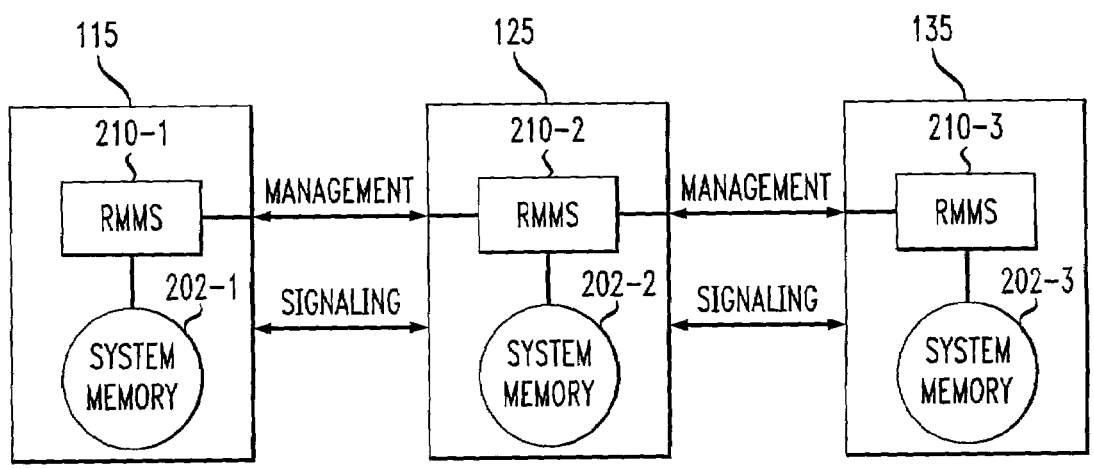
FIG. 2B is a block diagram illustrating interaction between AFM elements associated with different shelves of a daisy-chained DSL access multiplexer (DSLAM) of the FIG. 1 system.

FIG. 2B illustrates the interaction between RMMS elements 210-1, 210-2 and 210-3 of the respective AFMs 115, 125 and 135. As is shown, system resource management information is communicated between the RMMS elements 210-1, 210-2 and 210-3 of the AFMs. Each of the RMMS elements 210-1, 210-2 and 210-3 has access to corresponding system memory elements 202-1, 202-2 and 202-3, respectively. The management information communication channel illustrated in FIG. 2B may be implemented using a conventional protocol, such as a simple network management protocol (SNMP) or other suitable protocol. For example, the channel may be implemented through the use of messages transferred between shelves from one RMMS to another. Signaling information is also passed between the AFMs 115, 125 and 135 as indicated.

In accordance with the invention, during an initialization of the system 100, a determination is made as to the number of shelves in the daisy-chained DSLAM. This determination is preferably made automatically, by the system detecting the number of shelves via communication between the RMMS elements 210-1, 210-2 and 210-3 of the AFMs. As noted previously, the system 100 as shown in FIG. 1 includes three shelves.

Once the number of shelves in the daisy-chained DSLAM has been determined, the available system bandwidth is initially allocated equally between the shelves in accordance with the following function:

$$BW(shelf) = (total\_bandwidth - reserve\_pool)/number\_of\_shelves,$$

where BW(shelf) denotes the bandwidth allocated to each shelf, total_bandwidth denotes the total system bandwidth, reserve_pool denotes a designated amount of reserve bandwidth, and number_of_shelves is the number of shelves in the daisy-chained DSLAM as previously determined by self-detection or otherwise.

This initial allocation provides a uniform distribution of bandwidth over the shelves as well as a reserve pool which can be assigned on an as-needed basis to a shelf experiencing bandwidth resource depletion. A default size is preferably established for the reserve pool, such that it can be established without manual intervention, although reserve pool sizes differing from the default could of course also be selectable, e.g., by a system administrator. The system communicates the allocation information, including any allotments from the reserve pool, to the shelves of the daisy-chained DSLAM via the resource management information channel between RMMS elements as shown in FIG. 2B.

The run-time operation of the system, subsequent to the above-described initialization, is as follows:

1. Each shelf measures and accumulates its own bandwidth utilization history data.

2. A given shelf designated as a primary shelf of the daisy chain receives periodic utilization history updates from the remaining shelves of the daisy chain. These latter shelves are referred to herein as subtending shelves relative to the primary shelf. The primary shelf is typically the first shelf in the daisy chain, e.g., Shelf 1 in the example system of FIG. 1.

3. The subtending shelves include a control mechanism configured to request additional bandwidth when a bandwidth starvation situation is encountered. Such a control mechanism may be implemented in the RMMS elements of the subtending shelves.

4. The primary shelf includes a control mechanism which maintains the above-noted reserve pool and can allocate temporary additional bandwidth in response to requests from the subtending shelves. The control mechanism also allows the primary shelf to allocate additional bandwidth to itself from the reserve pool under appropriate circumstances. This control mechanism may be implemented in the RMMS element of the primary shelf.

5. The system periodically analyzes the utilization history data, computes new allocations based on predictions generated from the utilization history data, and updates the bandwidth allocations for all of the shelves of the system. Additional information, such as time of day, day of week, etc., can be used to index utilization against temporal behavior.

6. The system uses the management information communication channel illustrated in FIG. 2B to communicate utilization history, update and control information between the shelves.

As noted previously, conventional daisy-chained DSLAM systems are typically administered manually. An illustrative embodiment of a daisy-chained DSLAM system in accordance with the invention as described above automates both the initial system administration and periodic updates. The updates are predictive projections based on previous experience. In addition, the system in the illustrative embodiment provides the above-noted reserve pool which accommodates temporary surges in bandwidth consumption on one or more shelves in the daisy chain. Advantageously, the invention provides a system that can self-initialize its allocations of feeder bandwidth or other system resources, and subsequently self-optimize the allocations over time, thereby providing significant installation and run-time cost savings, as well as maximum run-time efficiency.

It should be noted that the system may be configured to automatically reduce the size of the reserve pool over time, as the allocation becomes optimized, such that increasingly larger portions of the initial reserve pool can be assigned to specific shelves.

Those skilled in the art will recognize that the above-described adaptive resource management techniques are not limited to use with the daisy-chained DSLAM of the illustrative embodiment, but are more generally applicable to any communication system which includes a chain or other interconnection of multiple switching or access modules for which bandwidth is allocated between elements of the interconnection. For example, the invention can be implemented in a system including a single shelf or other arrangement of interconnected modules, such as a single shelf corresponding to Shelf 1, Shelf 2 or Shelf 3 of the FIG. 1 system, in which case the APs and the AFM may collectively comprise a set of interconnected modules for which a system resource is allocated among the modules. Similarly, a given group of APs may be viewed as a set of interconnected modules.

As is apparent from the foregoing, the above-described illustrative embodiment of the invention is an example of a utilization-based embodiment in which bandwidth allocations are based on measured utilization history data. Specific examples of bandwidth allocation computations based on utilization history data will be described in conjunction with FIGS. 4A, 4B and 4C. An example of a request-based embodiment of the invention will be described in conjunction with the flow diagram of FIG. 5.

Figure 3:
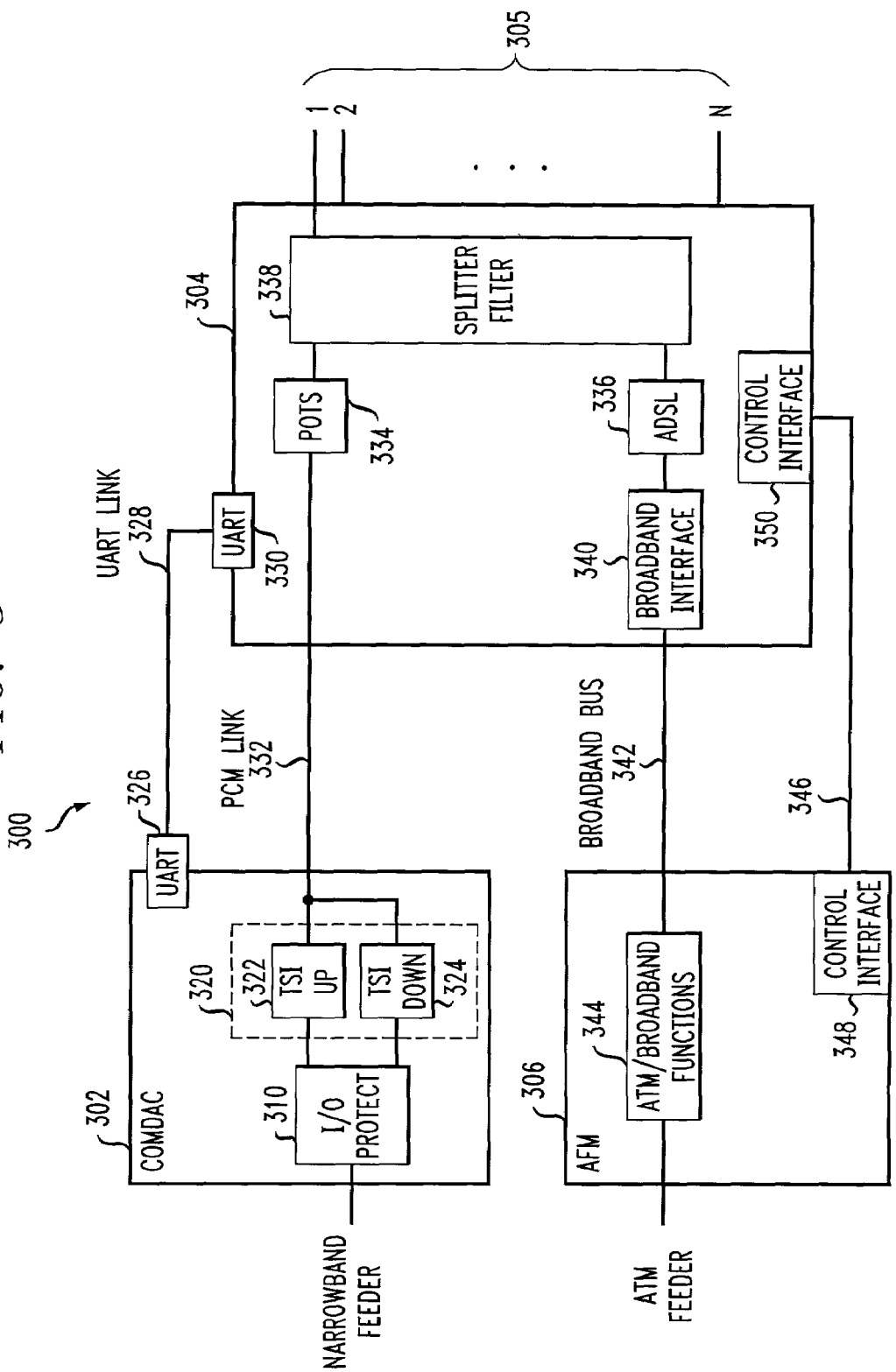
FIG. 3 is a block diagram of a portion of another exemplary communication system in which the invention is implemented.

FIG. 3 shows an alternative implementation of a portion of a communication system 300 in which the present invention may be implemented. The portion of the system 300 shown in FIG. 3 may represent at least in part a communication system switch and associated elements, such as the ATM switch 102 and associated elements in the system 100 of FIG. 1. The system 300 includes a combined data and control unit (COMDAC) 302, an N-port application pack (AP) 304 supporting a set 305 of N ADSL lines, and an ATM feeder multiplexer (AFM) 306. The AFM 306 may represent any one of the three AFMs 115, 125 or 135 of the FIG. 1 system.

The COMDAC 302 provides sub-rate connectivity to a narrowband feeder which may carry, e.g., conventional DS0 signals, and includes an input/output (I/O) and protection unit 310 and a processor 320. The processor 320 includes time slot interchange (TSI) up and down units 322 and 324, respectively. The COMDAC 302 communicates with the AP 304 via a universal asynchronous receiver/transmitter (UART) 326 that is coupled via a UART link 328 to a UART 330 of the AP 304. Other conventional backplane transceivers can be used in place of the UARTs in FIG. 3.

The TSI up and down units communicate via a sub-rate pulse coded modulation (PCM) link 332 with a POTS transceiver 334 of the AP 304. The POTS transceiver 334 converts PCM signals received from COMDAC 302 to analog format for delivery over the ADSL lines 305, and converts analog signals received from the ADSL lines 305 to PCM format for delivery to the COMDAC 302. The POTS transceiver 334 and an ADSL transceiver 336 are coupled to a splitter and filter unit 338 which is coupled to the ADSL lines 305.

The ADSL transceiver 336 communicates via a broadband interface 340 over a broadband bus 342 with an ATM/broadband functions unit 344 of the AFM 306. The ATM/broadband functions unit 344 receives ATM cells from and delivers ATM cells to an ATM feeder, which may represent a conventional OC-3 link or more generally an OC-x link, DS-x link or other type of link. The AFM 306 also communicates with the AP 304 via an internal interface controller link 346 between a control interface 348 of the AFM 306 and a control interface 350 of the AP 304.

As previously noted, the portion of the communication system 300 shown in FIG. 3 may be viewed as a communication system switch. Such a switch may be located between, e.g., a central office of the system and one or more business or residential customers each of which may be associated with one or more of the ADSL lines 305.

Additional details regarding example configurations and functions of the ATM/broadband functions unit 344 of the AFM 306 can be found in U.S. patent application Ser. No. 09/800,684 filed Mar. 7, 2001 in the name of inventors A. D. Baker et al. and entitled "Automatic Protocol Version Detection And Call Processing Reconfiguration in a Communication System," which is incorporated by reference herein.

Conventional aspects of the operation of certain elements shown in FIG. 3 are well understood in the art and therefore not described in detail herein. For example, additional details regarding the ATM communication aspects of the system 300 may be found in, e.g., ATM Forum, "ATM User-Network Interface Specification," Version 3.1, September 1994, ATM Forum, "ATM User-Network Interface (UNI) Signaling Specification," Version 4.0, July 1996, and in Martin de Prycker, "Asynchronous Transfer Mode: Solution for Broadband ISDN," Ellis Horwood, New York, 1993, all of which are incorporated by reference herein.

The system of FIG. 3 may be used to implement both utilization-based and request-based embodiments of the invention, as well as other embodiments, such as embodiments involving hybrid combinations of utilization-based and request-based resource management processes.

A more detailed example of the above-described utilization-based resource management process will now be described with reference to FIGS. 4A, 4B and 4C. In this example, it will be assumed that the system is configured in a manner similar to that shown in FIG. 1, with a daisy-chained DSLAM having three shelves denoted Shelf 1, Shelf 2 and Shelf 3, each having an AFM which is coupled to an OC-3 network feeder. It is further assumed that each shelf includes as its APs four distribution circuit packs which support ADSL full rate distribution loops, each with a nominal transceiver rate of 8 Mbps downlink and 1 Mbps uplink. Each shelf is thus assumed to be equipped with an equal number of distribution circuit packs of the same type, although different numbers and types of circuit packs or other APs could be used.

The example addresses the allocation of the downlink bandwidth, and assumes for simplicity and clarity of illustration that quality of service (QoS) queues are constructed such that 25% of the bandwidth available to the system is available for each of a number of different service classes. The reserve pool is assumed to be 20%. The service classes in this example are constant bit rate (CBR), real-time variable bit rate (rt-VBR), non-real-time variable bit rate (nrt-VBR), and unknown bit rate (UBR). It should be noted, however, that the assumptions made in this example and elsewhere herein are for purposes of illustration only, and should not be construed as limiting the invention in any way. For example, the described utilization-based allocation process can be applied to other types of transceivers, service classes, etc.

FIGS. 4A, 4B and 4C show tabular listings of bandwidth allocations for Shelf 1, Shelf 2 and Shelf 3 of the example daisy-chained DSLAM. For each of the shelves, the bandwidth allocations are shown for different time periods T for each of the above-noted service classes CBR, rt-VBR, nrt-VBR and UBR. FIGS. 4A, 4B and 4C show the progression of a given allocation through respective initial allocation, collection of utilization history data for a first period, and updating of allocations for a second period based on the first period utilization history. More specifically, the allocation table as shown in FIG. 4A includes initial equal bandwidth allocations at time period T=0, the allocation table as shown in FIG. 4B includes actual utilization data at the end of time period T=0, and the allocation table as shown in FIG. 4C includes the resulting new allocations for time period T=1 based on the utilization data at the end of time period T=0.

Although the bandwidth allocation updates are shown in the figures only for time period T=1, it will be apparent that updates for the subsequent periods may be carried out in a similar manner.

At the beginning of time period T=0, also denoted herein as T(0), the system initially determines the number of shelves in the system in the manner previously described, and sets up a table in the format shown in FIG. 4A. Given that there is no prior history of utilization at this point, the system calculates the previously-described initial allocation, which in the present example is based solely on the bandwidth available to the system (e.g., the feeder resource), the size of the reserve pool, the service classes, and the arrangement of distribution circuit packs. This initial calculation is carried out as follows:

T(0) Calculation:

Number of shelves=3

Feeder Capacity=155 Mbps (OC-3)

Shelf Detail: 8 distribution packs per shelf

Pack Detail: 8 ADSL full-rate transceivers per distribution pack

Using the ADSL transceiver as a basis unit:

Bandwidth Available (all classes)=155 Mbps−20%=124 Mbps.

Initial Allocation=Shelf_1_$BW$+Shelf_2_$BW$+Shelf_3_BW, where Shelf_x_BW is proportional to its number of transceiver units relative to the number of units distributed throughout the system, in this case Shelf_1_units=8 packs×8 transceiver units per pack=64 units.

Note that in this example the system selects a unit size based on the lowest common transceiver bandwidth capability in the system, and then computes the allocations proportionally based on that unit assignment. Shelves 2 and 3, for purposes of illustration, have the same number of units as Shelf 1, so:

Total number of units in the system=64×3=192

Shelf_1 proportion=64/192=⅓

Shelf_1_$T(0)$ allocation=124 Mbps×⅓=41.33 Mbps

Note that if one of the shelves had a different mix of distribution packs, the initial proportion would have accommodated that variance for the T(0) allocation. The per class allocations at T(0) are set at an arbitrary value of 1/(the number of supported classes). In the current example, that is ¼ of the total available bandwidth for each class. The T(0) allocation is then stored in system memory in the table format shown in FIG. 4A.

As previously indicated, FIG. 4B shows the utilization history data at the end of time period T=0. The individual shelves can track, analyze and report their utilization histories in a similar manner, such that at the end of a given period the system has compiled the needed utilization history data over that period. At this point in time the system adjusts the allocation based on resource availability, utilization history and a designated update function. For the present example, it is assumed that the resource availability is the same from period to period, and the utilization history data at the end of period T=0 is as given in FIG. 4B. A simple type of update function that may be used to determine the updated allocations is as follows:

$$\text{Value(new)}=\text{Value(old)}-\tfrac{1}{2}\text{Value(change)},$$

where Value(new) denotes the new allocation, Value(old) denotes the old allocation, and Value(change)=Value (old)−Value(new). This is an example of a damping function that may be used as an update function in accordance with the invention. Numerous other damping functions or other types of update functions may be used in other embodiments. For the Shelf 1 CBR service class at the end of time period T=0, the above update function yields $$CBR(new)=10.33-\tfrac{1}{2}(10.33-15.33)=10.33-\tfrac{1}{2}(5)$$
$$=10.33+2.5=12.83$$

This calculation is repeated for each service class on each shelf. The allocation table is then populated with the updated allocations, and the resource is allocated as indicated. As previously noted, FIG. 4C shows the updated allocations as determined for the period T=1 based on the utilization history data from the previous period T=0.

The bandwidth allocation may be normalized against one or more stated system objectives, e.g., the system may total the allocated bandwidth for each shelf and service class, and then calculate a correction factor to be applied to the allocation. The correction factor may be calculated by, e.g., summing the updated bandwidth allocations per shelf and per class, and then dividing that result by a normative system target within known capability limits of the system. The correction factor is then applied to the results of the utilization-based allocation adjustment. For example, in the case of the CBR service class, summation of the bandwidth allocations is given as follows:

$$\text{Shelf\_1\_}BW+\text{Shelf\_2\_}BW+\text{Shelf\_3\_}BW=12.83+9.08+7.93=29.84$$

The system target for this service class is 31, so the correction factor is 29.84/31, which equals 0.948. Dividing each entry for CBR service at time T=1 in the FIG. 4C allocation table yields the final allocation for CBR service. A similar normalization process can be implemented for each of the other supported service classes.

When the allocation update process is completed, the appropriate entries are made in the allocation table, and the designated allocations may then be transmitted on a per-shelf basis or otherwise from the primary shelf RMMS element to the subtending shelf RMMS elements via the management information channel shown in FIG. 2B.

The allocation table may be stored in a system memory associated with one or more of the shelves, e.g., memory 202-1 associated with the primary Shelf 1 in the system 100 of FIG. 1. Other storage arrangements are also possible, e.g., each shelf may store its own portion of the allocation table information as well as that of one or more other shelves.

As previously noted, call traffic in excess of a current allocation for a given shelf may be handled by drawing from the reserve pool. In this case, when a call request is delivered to a given shelf, and that shelf determines that is does not have sufficient allocation capacity to establish a valid service connection for that call, then the RMMS element of that shelf signals via the above-described management information channel to the RMMS element of the primary shelf that an additional temporary allocation is required. If the primary shelf RMMS element has capacity available in the reserve pool to honor such a request, then a temporary additional allocation is made to the requesting shelf, and call processing proceeds. However, if there is insufficient capacity available in the resource pool to support the additional allocation request, then the primary shelf RMMS element provides a suitable indication via the management information channel to the RMMS element of the requesting shelf, which then initiates call disestablishment, bandwidth reduction negotiations, or other appropriate action.

Allocation calculations yielding results in excess of available bandwidth may be modified by convention to the limit of the actual physical capability of the feeder. In such a condition, the primary shelf RMMS element may send a message to an external element management system advising it of the resource exhaustion condition. The external element management system may be associated with a system element such as switch 102 of FIG. 1.

The example described in conjunction with FIGS. 4A, 4B and 4C performed allocation updates based on measured utilization history data. However, it is also possible to implement the invention using techniques which do not involve utilization history data. An example of one such other technique will now be described in conjunction with FIG. 5.

Figure 5:
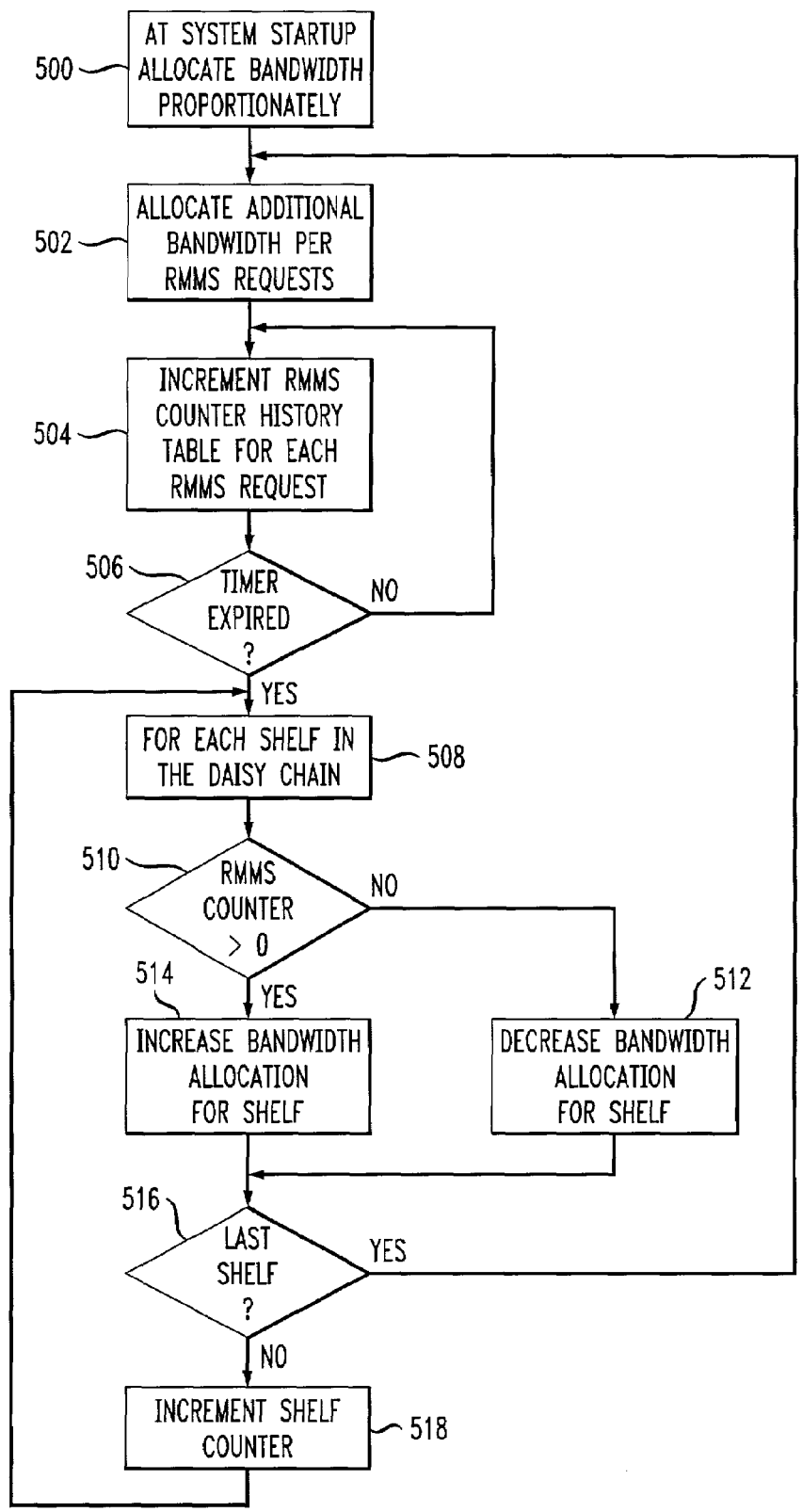
FIG. 5 is a flow diagram of an example request-based resource management process in accordance with the present invention.

FIG. 5 is a flow diagram of an example request-based resource management process in accordance with the invention. As noted above, this process may be viewed as an alternative to the utilization-based approach previously described. Step 500 indicates that bandwidth is allocated proportionally at system startup or initialization, in a manner similar to that previously described in conjunction with the utilization-based approach. In step 502, additional bandwidth is allocated based on a history of RMMS element requests for additional bandwidth.

A counter history table is maintained in system memory for each RMMS element, and as requests are received from RMMS elements, the corresponding counters are updated in the counter history table as indicated in step 504. Step 506 then determines if a designated timer has expired. If the timer has not expired, the process returns to step 504 to continue incrementing the table based on received requests. If the timer has expired, the process moves to step 508 which starts a loop for each shelf in the daisy-chained DSLAM.

For a given one of the RMMS elements, the process in step 510 determines if the associated request count is greater than zero. If it is not greater than zero, the bandwidth allocation for the corresponding shelf is decreased by a designated amount, as indicated in step 512. If the associated request count is greater than zero, the bandwidth allocation for the corresponding shelf is increased by a designated amount, as indicated in step 514. Step 516 returns the process to step 508 via step 518 to perform the loop to check the request counter for the next shelf. After the loop is completed for all of the shelves, the process returns to step 502 as shown.

The FIG. 5 process thus monitors the number of requests for additional bandwidth made to the primary shelf RMMS, and periodically adjust the shelf allocations accordingly.

The terms "period" and "periodically" as used herein are intended to be construed generally to encompass any time period, and are therefore not restricted to uniform, cyclic or otherwise equal time periods. The time periods may also be configured to take into account the above-noted additional indexing information such as time of day, day of week, etc.

The above-described system implementations are shown by way of example only. Those skilled in the art will recognize that the invention can be used with other configurations of elements as required for a particular application. For example, although the illustrative embodiments are particularly well suited for use in transmission applications involving ATM transmitted over DSL network connections, the invention can also be implemented in other types of communication systems including, for example, Frame Relay systems, IP systems, etc. In addition, the invention can be used with other types of transport mechanisms and communication links. Moreover, although illustrated in conjunction with DSLAMs, the invention is applicable to other types and arrangements of interconnected modules for which a system resource is allocated among the modules.

It will be recognized that many alternative configurations are possible for systems 100 and 300 and the elements thereof, e.g., using elements other than those shown in FIGS. 1, 2A, 2B and 3, and it should again be emphasized that the invention is not restricted to use with any particular system configuration.

As previously noted, the present invention can be implemented in whole or in part in software stored on a machine-readable medium, e.g., an optical or magnetic disk, a disk-based storage device, an electronic memory, etc., and executed by a processor associated with a communication switch or other similar element or set of elements of a communication system. For example, the operations referred to herein as being performed by an RMMS element can be implemented in whole or in part in software running on an associated processor such as processor 200 of FIG. 2A. As another example, the invention could be implemented at least in part in software executed by an external element management system associated with a system element such as switch 102 of FIG. 1.

These and numerous other alternative embodiments within the scope of the following claims will be apparent to those skilled in the art.

What is claimed is:

1. A method for allocating a system resource in a communication system having an interconnected set of modules and for which the system resource is allocated among the modules, the method comprising the steps of:
   initially allocating the system resource among the modules in accordance with a predetermined allocation; and
   periodically updating the allocation of the system resource based at least in part on measured characteristics of at least a subset of the modules, the measured characteristics being indicative of utilization of the initial allocation;
   wherein the interconnected set of modules comprises a multi-shelf daisy-chained DSL access multiplexer (DSLAM), with each of the modules corresponding to a particular shelf of the DSLAM.

2. The method of claim 1 wherein each of the shelves of the DSLAM has associated therewith a resource measurement and management system (RMMS) element that processes information relating to the initially allocating and periodically updating steps.

3. The method of claim 1 wherein a given one of the shelves of the DSLAM is designated as a primary shelf and the remaining shelves of the DSLAM are denoted as subtending shelves, the primary shelf implementing at least one of the initially allocating and periodically updating steps in an RMMS element associated therewith.

4. The method of claim 1 wherein the system resource comprises a feeder bandwidth associated with the interconnected set of modules.

5. The method of claim 1 wherein the step of initially allocating the system resource among the modules in accordance with a predetermined allocation is implemented automatically by the system without manual intervention.

6. The method of claim 1 wherein the step of periodically updating the allocation of the system resource based at least in part on measured characteristics of at least a subset of the modules, the measured characteristics being indicative of utilization of the initial allocation, is implemented automatically by the system without manual intervention.

7. The method of claim 1 wherein the step of periodically updating the allocation of the system resource based at least in part on measured characteristics of at least a subset of the modules, the measured characteristics being indicative of utilization of the initial allocation, further comprises the step of measuring utilization history data for each of at least a subset of the modules, and reallocating the system resource to the modules based at least in part on the measured utilization history data.

8. The method of claim 1 wherein information characterizing an initial allocation of the system resource and at least one periodic update of the allocation is stored in a tabular format in a system memory.

9. A method for allocating a system resource in a communication system having an interconnected set of modules and for which the system resource is allocated among the models, the method comprising the steps of:
   initially allocating the system resource among the modules in accordance with a predetermined allocation and establishing a reserve pool with a first portion of the system resource and equally dividing a remaining portion of the system resource among the interconnected modules; and
   periodically updating the allocation of the system resource based at least in part on measured characteristics of at least a subset of the modules, the measured characteristics being indicative of utilization of the initial allocation;
   wherein the interconnected set of modules comprises a multi-shelf daisy-chained DSL access multiplexer (DSLAM), with each of the modules corresponding to a particular shelf of the DSLAM.

10. The method of claim 9 wherein a size of the reserve pool is automatically reduced by designated amounts as a function of time.

11. A method for allocating a system resource in a communication system having an interconnected set of modules and for which the system resource is allocated among the modules, the method comprising the steps of:
    initially allocating the system resource among the modules in accordance with a predetermined allocation; and
    periodically updating the allocation of the system resource based at least in part on measured characteristics of at least a subset of the modules, the measured characteristics being indicative of utilization of the initial allocation, and measuring for each of at least a subset of the modules a number of requests for additional amounts of the resource, and reallocating the system resource to the modules based at least in part on the measured numbers of requests;
    wherein the interconnected set of modules comprises a multi-shelf daisy-chained DSL access multiplexer (DSLAM), with each of the modules corresponding to a particular shelf of the DSLAM.

12. A method for allocating a system resource in a communication system having an interconnected set of modules and for which the system resource is allocated among the modules, the method comprising the steps of:
    initially allocating the system resource among the modules in accordance with a predetermined allocation; and
    periodically updating the allocation of the system resource based at least in part on measured characteristics of at least a subset of the modules, the measured characteristics being indicative of utilization of the initial allocation, and normalizing an updated allocation against one or more system objectives by applying a correction factor to the updated allocation;

wherein the interconnected set of modules comprises a multi-shelf daisy-chained DSL access multiplexer (DSLAM), with each of the modules corresponding to a particular shelf of the DSLAM.

13. The method of claim 12 wherein the correction factor is determined by summing updated resource allocations for each module for each service class supported by that module, and then dividing the result by a normative system target within known capability limits of the system.

14. An apparatus for use in allocating a system resource in a communication system having an interconnected set of modules and for which the system resource is allocated among the modules, the apparatus comprising:

at least one processor operative to initially allocate the system resource among the modules in accordance with a predetermined allocation, and to periodically update the allocation of the system resource based at least in part on measured utilization history information of at least a subset of the modules, the measured utilization history information being indicative of utilization of the initial allocation; and a memory coupled to the processor for storing information associated with allocation of the system resource;

wherein the interconnected set of modules comprises a multi-shelf daisy-chained DSL access multiplexer (DSLAM), with each of the modules corresponding to a particular shelf of the DSLAM.

15. A machine-readable medium storing one or more programs for use in allocating a system resource in a communication system having an interconnected set of modules and for which the system resource is allocated among the modules, wherein the one or more programs when executed by a processor implement the steps of:

initially allocating the system resource among the modules in accordance with a predetermined allocation; and periodically updating the allocation of the system resource based at least in part on measured utilization history information of at least a subset of the modules, the measured utilization history information being indicative of utilization of the initial allocation;

wherein the interconnected set of modules comprises a multi-shelf daisy-chained DSL access multiplexer (DSLAM), with each of the modules corresponding to a particular shelf of the DSLAM.

* * * * *